Sept. 7, 1965 R. C. REMPEL 3,204,471
ANGLE ADJUSTING MECHANISM FOR OPTICAL ELEMENTS
Filed July 24, 1963 2 Sheets-Sheet 1
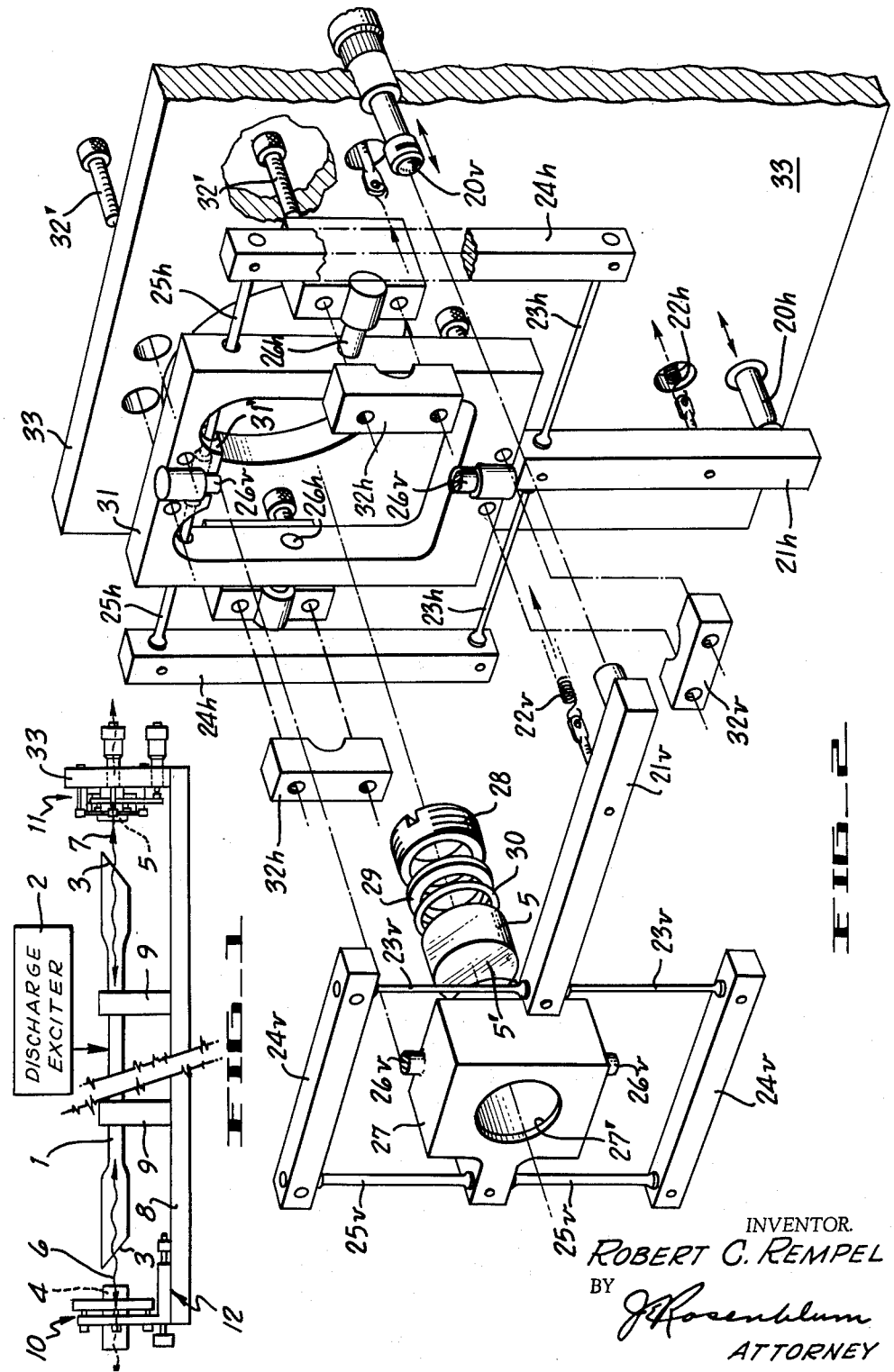
INVENTOR.
ROBERT C. REMPEL
BY
J. Rosenblum
ATTORNEY

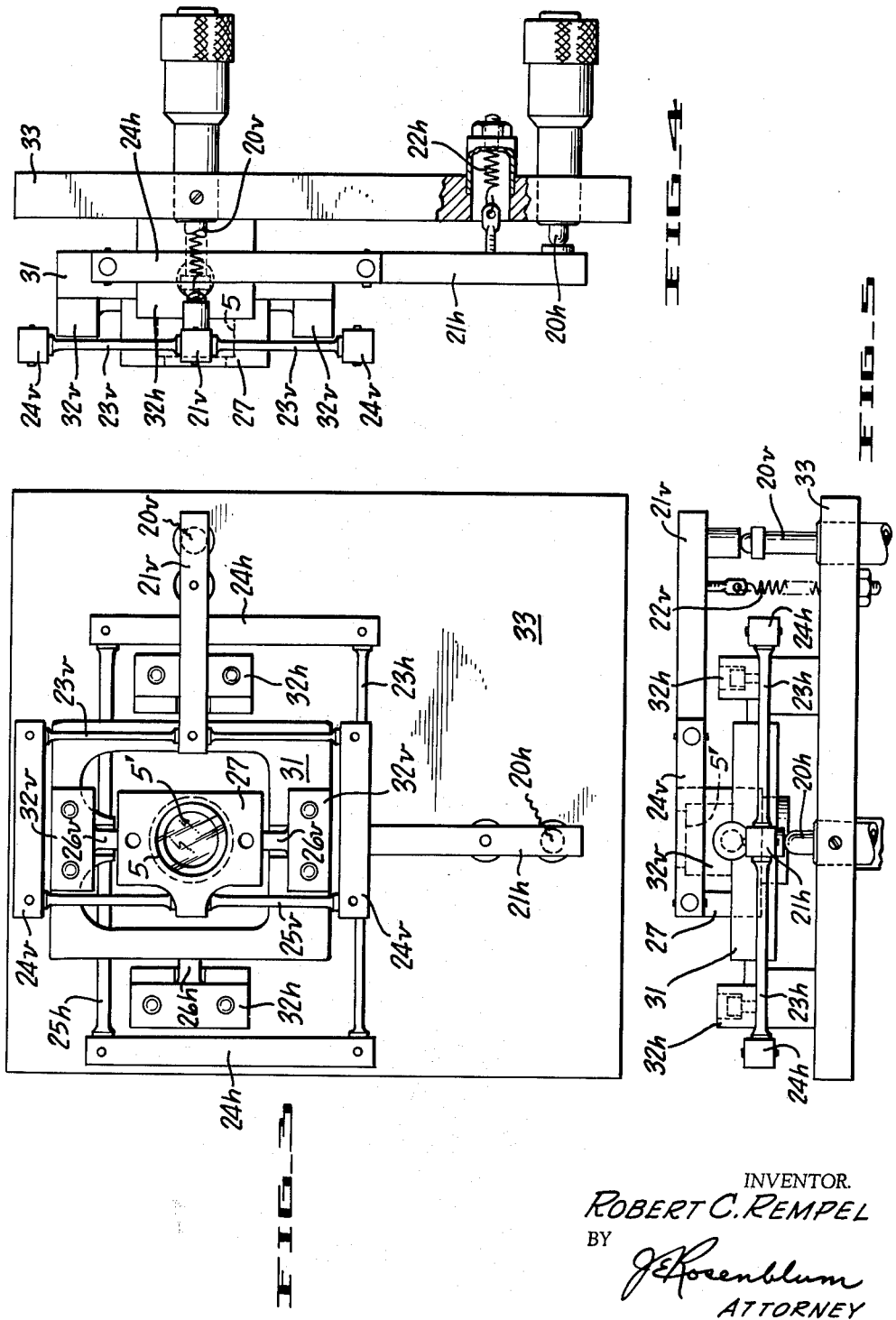

United States Patent Office 3,204,471
Patented Sept. 7, 1965

3,204,471
ANGLE ADJUSTING MECHANISM FOR OPTICAL ELEMENTS
Robert C. Rempel, Los Altos, Calif., assignor to Spectra-Physics, Inc., Mountain View, Calif., a corporation of California
Filed July 24, 1963, Ser. No. 297,308
5 Claims. (Cl. 74—89)

The present invention relates in general to optics, and more particularly to a novel mechanism for making precise angular adjustments of optical elements such as laser reflectors.

In a laser (or optical maser), an active medium of quantum resonant particles is excited to emit optical radiation and an optical resonator, comprising a pair of optically-facing reflectors (or mirrors), reflects radiation of a particular wave-length several times back and forth through the active medium. The reflected wavelength corresponds to the separation between two discrete energy levels of the medium so that particles in the upper energy level are stimulated to emit synchronously-phased radiation of this wavelength and undergo transitions to the lower energy level. When the stimulated emission gain due to an excess particle population in the upper state (inversion) overcomes all losses, laser oscillation is established, and a coherent radiation output obtained, at the reflected wavelength. For more detailed discussions, reference is made to Applied Optics, 1962 Supplement on Optical Masers.

Proper operation of a laser depends on precise angular alignment of the resonator reflectors. For example, in a resonator comprising two parallel flat reflectors, the reflectors must be parallel to within about one arc second in order to prevent the radiation from "walking" off the reflectors before experiencing sufficient stimulated emission gain for laser oscillation. As a further example, in a resonator comprising one flat reflector and one spherical reflector separated by the radius of curvature of the spherical reflector, the radiation pattern is focussed to a point on the flat reflector. Although the alignment requirements for laser oscillation in this case are not as severe as those for the two flat reflectors, it is desirable to have a precision angle adjustment for the spherical reflector which will permit the spot focus to be positioned at a point on the flat reflector which optimizes the power output and/or which is free of any surface imperfection which would prohibit the attainment of a uniphase output wavefront.

One known technique for obtaining a precision rotation consists of applying torsion to a rigidly secured rod by means of a lever. The rotation results from the elastic twisting of the rod without sliding or sticking friction. In order to obtain a high resolution angular adjustment with a reasonably large amount of lever motion (as is required when commercially-available micrometers are used to drive the lever), a differential rod assembly is desirable in which a thin torsion rod is used to take up the motion of the lever and a thick supporting rod is used for imparting the ultimate rotation. When applying this principle to a mechanism for a laser reflector, it is necessary that the supporting rod for the reflector be sufficiently thick and rigid to avoid the transmission of mechanical and acoustical disturbances which can, for example, vary the laser oscillation frequency as a consequence of small variations in the spacing between the two reflectors of the optical resonator. In order to twist such a supporting rod, the lever is required to transmit a bending moment which exerts a shearing stress in the torsion rod which can be sufficiently large to cause plastic flow and destroy the elastic properties of the mechanism.

It is a principal object of the present invention to provide a novel torsion rod structure for angular adjustment of an optical element such as a laser reflector which enables the optical element to be supported by a rod of sufficient thickness for mechanical rigidity while permitting a large lever movement which applies a large bending moment without exceeding the torsion rod elastic limit.

Another object is the provision of an angle adjustment mechanism for a laser reflector which permits independent rotation about each of two perpendicular axes without changing the spacing between the separate reflectors of the optical resonator.

Still another object of the present invention is the provision of an angle adjustment mechanism for an optical element which permits both coarse and fine angular adjustments to be made with a single pair of micrometer lead screws.

These and other objects and advantages of the present invention will become apparent upon a consideration of the following detailed specification taken in connection with the accompanying drawing, wherein:

FIGURE 1 is an elevational view of a typical laser embodying a reflector angle adjusting mechanism in accordance with the present invention;

FIGURE 2 is an exploded perspective view of a laser reflector angle adjustment mechanism in accordance with the present invention;

FIGURE 3 is a front view of the reflector adjustment mechanism of FIGURE 2;

FIGURE 4 is a bottom view of the reflector adjustment mechanism of FIGURE 2; and FIGURE 5 is a right side view of the reflector adjustment mechanism of FIGURE 2.

Referring to FIGURE 1, a typical laser includes a plasma tube 1 filled with a gas mixture of 90% helium and 10% neon at a pressure of about 1 torr, and excited to optical emission by means of a power source 2 which excites an electrical discharge in the gas. The axially propagated radiation is directed, via windows 3 inclined at Brewster's angle for maximum transmission, to resonator reflectors 4 and 5 which reflect the radiation back and forth a sufficient number of times to sustain laser oscillation. For a helium-neon laser, typical oscillation wavelengths are 6328 A., 11,523 A. or 33,912 A., the particular wavelength being determined by the peak reflectivity of the reflectors. The small transmission through the reflectors at the oscillation wavelength constitutes the output beams 6 and 7.

The laser base 8 carries plasma tube supports 9, coarse angle adjustment mount 10 for reflector 4, and a precision coarse and fine angle adjustment mount 11 for reflector 5. Mount 10 is supported via dovetail slide assembly 12 which permits adjustments to be made in the separation between the reflectors 4 and 5.

The precision angle adjusting mechanism 11 in accordance with the present invention is shown in detail in FIGURES 2-5.

The mechanism for effecting rotation about the vertical axis comprises a micrometer lead screw mechanism 20v which exerts a force on the free end of rigid lever bar 21v (loaded by spring 22v), this force causing a substantial twisting deformation of torsion rod 23v brazed thereto and of parallel torsion rod 25v which is joined to rod 23v via rigid lever bars 24v brazed to the ends of the rods. A bending moment developed by the force of micrometer 20v against lever bar 21v is also transferred, via lever bars 24v and reflector housing block 27, to the intermediate rigid supporting rods 26v; and it is the resultant small twisting of these supporting rods which causes the vertical axis fine angular adjustment of reflector 5, the reflector 5 being retained in housing block 27 (with reflecting surface 5' against housing shoulder 27') by means of retaining ring 28 which (as can be seen from FIGURE 2) threads into the opposite end of the opening in housing block 27 and exerts pressure on the reflector via spacer 29 and rubber O-ring 30.

Similarly the mechanism for effecting rotation about the horizontal axis comprises a micrometer lead screw mechanism $20h$ which drives the free-end lever bar $21h$ and twists torsion rods $23h$ and $25h$ joined by lever bars $24h$. A bending moment developed by the force of micrometer $20h$ against bar $21h$ is transmitted via lever bars $24h$ and yoke 31 (brazed to torsion bar $25h$ at projection 31') to rigid supporting rods $26h$; and it is the small twisting of these rods which causes the horizontal axis fine angular adjustment of reflector 5, the reflector housing block 27 being attached to the yoke 31 via the supporting rods $26v$.

Each of the supporting rods 26 is secured at the outer end by a bearing block 32. For coarse angular adjustment the bearing blocks are loosened so that the micrometer lead screw motion is transformed directly to free rotation of the supporting rods in the bearing blocks. After a coarse adjustment is made, the blocks 32 are clamped tight (by tightening up on the clamping screws 32') for fine angular adjustments, angular rotation of the reflector housing now being entirely the result of torsion in the supporting rods 26. Note that the horizontal axis bearing blocks $32h$ are secured to the fixed vertical frame member 33 and that both the vertical axis bearing blocks $32v$ and the horizontal axis torsion bars $26h$ are secured to the rigid yoke 31. The horizontal and vertical angular adjustments are independent of each other and have no effect on the spacing between the reflectors, thereby enabling quick optimization of the resonator configuration.

Since torsion rods 23 and 25 are slender compared to the corresponding supporting rods 26, the travel $\Delta$ of the micrometer screw 20 is given by the formula $$\Delta = D_1\theta_1 + D_3\theta_3$$

where $D_1$ is the distance from the micrometer contact to torsion rod 25, $D_3$ is the distance from the micrometer contact to torsion rod 23, $\theta_1$ is the torsional rotation of rod 25, and $\theta_3$ is the torsional rotation of rod 23. The use of two torsional rods permits a substantial range of micrometer movement $\Delta$ and the development of a large twisting force since the outer-skin torsional stress is divided between the two rods. For equal stress on the two rods, the ratio $d_1/d_3$ of the diameter of rod 25 to the diameter of rod 23 is chosen to be equal to the cube-root of the ratio $D_1/D_3$. Increasing the allowable force increases the amount of torsion which can be applied to the supporting rods 26.

The ratio of the angular deflection $\theta_2$ of supporting rods 26 to the linear deflection $\Delta$ of the micrometer-driven lever 21 (rods 23, 25 and 26 being made from material of the same shear modulus) is given by the formula $$\theta_2/\Delta = (d_1/d_2)^4(L_2D_2/LD_1^2)/[1+(D_3/D_1)^2(d_1/d_3)^4]$$

where $d_2$ is diameter of supporting rods 26, L is the length of torsion rods 23 and 25, and $L_2$ is the total length of the corresponding pair of supporting rods 26. In an exemplary embodiment, designed to give exactly one arc second reflector rotation for each mil of micrometer movement using stainless steel rods, the values (in inches) for the vertical axis structure are: $L=2\frac{1}{4}$, $D_1=3$, $D_2=2\frac{1}{2}$, $D_3=1\frac{5}{8}$, $L_2=.394$, $d_1=.0872$, $d_2=.1365$, $d_3=.0705$, and the values (in inches) for the horizontal axis structure are: $L=3$, $D_1=3\frac{1}{2}$, $D_2=2\frac{3}{4}$, $D_3=1\frac{5}{16}$, $L_2=.394$, $d_1=.0986$, $d_2=.139$, $d_3=.0705$. The resolution of the micrometers is 0.1 mil, resulting in an angular rotational resolution of 0.1 arc second. The total angular range is 300 arc seconds, with the maximum shearing stress in the torsion bars 23 and 25 being less than one-third the plastic flow limit of about 36,000 p.s.i.

For convenience, the terms "horizontal" and "vertical" are used in the specifictiton and claims in a relative sense only, it being apparent that the structure may be used in any desired orientation.

I claim:

1. A precision angular rotation adjustment mechanism for an optical element, comprising: a pair of parallel torsion members, said members being rigidly joined together; a rigid lever member joined at one end thereof to one of said torsion members; a rigid optical element housing structure joined to the other of said torsion members; a supporting structure joined to said optical element housing structure; means for securing said supporting structure, at the ends thereof; and means driving the other end of said lever member for applying torsion to said torsion members and said supporting structure, the angular deflection resulting from the torsion in said supporting structure effecting angular rotation of said optical element housing.

2. A mechanism according to claim 1 wherein said torsion members are rods, the ratio of the diameters of said rods being equal to the cube root of the ratio of the distances of said rods from the driven point of said lever member.

3. A precision optical element adjustment mechanism for effecting independent angular adjustments about horizontal and vertical axes, comprising: a rigid yoke, said yoke being secured to a fixed member by means of a pair of axially-aligned supporting rods extending horizontally from said yoke; a rigid optical element housing secured within said yoke by means of a pair of axially-aligned supporting rods extending vertically from said yoke; a pair of vertically-extending torsion rods on opposite sides of said optical element housing, said torsion rods being joined together at the ends thereof by a pair of rigid members, one of said rods being attached to said optical element housing; a horizontally-extending rigid lever member joined at one end thereof to the other of said torsion rods; a micrometer lead screw structure driving the other end of said lever member for applying torsion to said vertically-extending torsion and support rods, the angular deflection resulting from the torsion in said supporting rods effecting angular rotation of said optical element housing about a vertical axis; a pair of horizontally-extending torsion rods on opposite sides of said yoke, said torsion rods being joined together at the ends thereof by a pair of rigid members, one of said rods being attached to said yoke; a vertically-extending rigid lever member joined at one end thereof to the other of said horizontally-extending torsion rods; a micrometer lead screw structure driving the other end of said vertically-extending lever member for applying torsion to said horizontally-extending torsion and supporting rods, the angular deflection resulting from the torsion in said supporting rods effecting angular reflection of said optical element housing about a horizontal axis.

4. A mechanism according to claim 3 wherein the ratio of the diameter of said vertically-extending torsion rods is equal to the cube root of the ratio of the distances of said rods from the driven point of said horizontally-extending lever member, and the ratio of the diameters of said horizontally-extending torsion rods is equal to the cube root of the ratio of the distances of said rods from the driven point of said vertically-extending lever member.

5. A mechanism according to claim 3 including bearing blocks for securing the outer ends of said supporting rods, and means for loosening said bearing blocks to permit coarse angular adjustments of said reflector housing with said micrometer lead screws.

References Cited by the Examiner

UNITED STATES PATENTS 2,989,872   6/61   Dvoracek _____ 74—99

BROUGHTON G. DURHAM, *Primary Examiner.*

UNITED STATES PATENT OFFICE
CERTIFICATE OF CORRECTION

Patent No. 3,204,471

September 7, 196

Robert C. Rempel

It is hereby certified that error appears in the above numbered patent requiring correction and that the said Letters Patent should read as corrected below.

Column 4, line 68, for "reflector" read -- optical element --.

Signed and sealed this 28th day of June 1966.

(SEAL)
Attest:

ERNEST W. SWIDER
Attesting Officer

EDWARD J. BRENNER
Commissioner of Patents